United States Patent [19]
Mushrush et al.

[11] Patent Number: 5,705,087
[45] Date of Patent: Jan. 6, 1998

[54] FUEL SYSTEM ICING INHIBITOR AND DEICING COMPOSITION

[75] Inventors: George W. Mushrush, Oakton; Dennis Hardy, Alexandria, both of Va.

[73] Assignee: The United States of America as represented by the Secretary of the Navy, Washington, D.C.

[21] Appl. No.: 655,789

[22] Filed: May 31, 1996

[51] Int. Cl.$^6$ .................................................. C09K 3/18
[52] U.S. Cl. ............................................ 252/70; 106/13
[58] Field of Search ................................ 252/70; 106/13

[56] References Cited

U.S. PATENT DOCUMENTS

| | | | |
|---|---|---|---|
| 2,388,164 | 10/1945 | Loder | 106/13 |
| 4,594,076 | 6/1986 | Blake et al. | 106/13 |
| 4,960,531 | 10/1990 | Connor et al. | 252/70 |
| 5,043,088 | 8/1991 | Falla | 252/70 |

*Primary Examiner*—Anthony Green
*Attorney, Agent, or Firm*—Thomas E. McDonnell; George Kap

[57] ABSTRACT

This invention pertains to hydrocarbon fuel composition and deicing composition prepared with a compound selected from the group consisting of acetals, ketals, esters, derivatives thereof and mixtures thereof; and a process for deicing a substrate using the noted deicing composition.

18 Claims, 3 Drawing Sheets

FUEL SYSTEM ICING INHIBITOR AND DEICING COMPOSITION

BACKGROUND OF THE INVENTION

1. Field of the Invention

The purpose of the present invention is to use classes of compounds made from glycerol, sugars, and starches that are effective as fuel system icing inhibitors and deicing compositions which are biodegradable.

2. Description of Related Art

Fuel icing inhibitor additives ethylene glycol monomethyl ether (EGME) and diethylene glycol monomethyl ether (DiEGME), have been employed in both aircraft and worldwide commercial aviation fuels as fuel system icing inhibitors. Both ethylene and propylene glycols and mixtures of these glycols have been used for wing deicing applications. Concentrations used depend on both temperature and restrictions on runoff from the runways.

Deicing compositions have also been employed to remove or destroy ice and snow. The most commonly used chemical deicer is sodium chloride. Other deicers include a mixture of calcium and magnesium acetates, however, this class of deicer is expensive to manufacture. Unfortunately, these deicing compositions are disadvantageous because they cause corrosive damage to metal structures since they are ionic in nature.

Also, most of the above-mentioned icing inhibitors are toxic at the concentrations needed for effective deicing. For example, the additives leach out of the fuel and into water at the bottom of fuel tanks. When this water is drained from fuel system pumps, filter and storage tanks, it contains EGME/DiEGME and creates an environmental hazard. Also, glycols and their derivatives exert high oxygen demand for decomposition. When introduced into the environment, they deplete dissolved oxygen, killing many aquatic organisms.

Various industries, NASA, and the FAA have proposed propylene glycol-based deicing compounds, however, these materials have been shown to be unsuitable due to higher costs per unit effectiveness. These compounds are also toxic, but less toxic than either EGME or DiEGME.

Accordingly, there is the need for a new commercial class of fuel composition deicing inhibitors and deicing compositions which are benign, biodegradable, non-corrosive, as well as inexpensive to produce.

SUMMARY OF THE INVENTION

It is therefore an object of the present invention to provide an improved fuel composition deicing inhibitor which is both benign and biodegradable.

It is another object of the present invention to provide a fuel composition deicing inhibitor which is inexpensive to produce.

It is an additional object of the present invention to provide a non-corrosive fuel composition deicing inhibitor comprising compounds obtained from readily available sources, and which is non-corrosive.

It is another object of the present invention to provide an improved deicing composition which is both benign and biodegradable which can be used in a deicing process.

It is also an object of the present invention to provide a deicing composition which is inexpensive to produce.

It is an additional object of the present invention to provide a non-corrosive deicing composition comprising compounds obtained from readily available sources.

These and other objects are accomplished by fuel and deicing compositions and a process for deicing a substrate using deicing compositions of this invention. The fuel and the deicing compositions of this invention are prepared with a compound selected from the group consisting of acetals, ketals, esters and mixtures thereof or derivatives of the acetals, ketals, esters and mixtures thereof. The selected compound is a reaction product of a hydroxy compound having from 2 to 6 hydroxy (OH) groups with an aldehyde, or a ketone, or a carboxylic acid.

DESCRIPTION OF THE PREFERRED EMBODIMENTS

Figure 1:
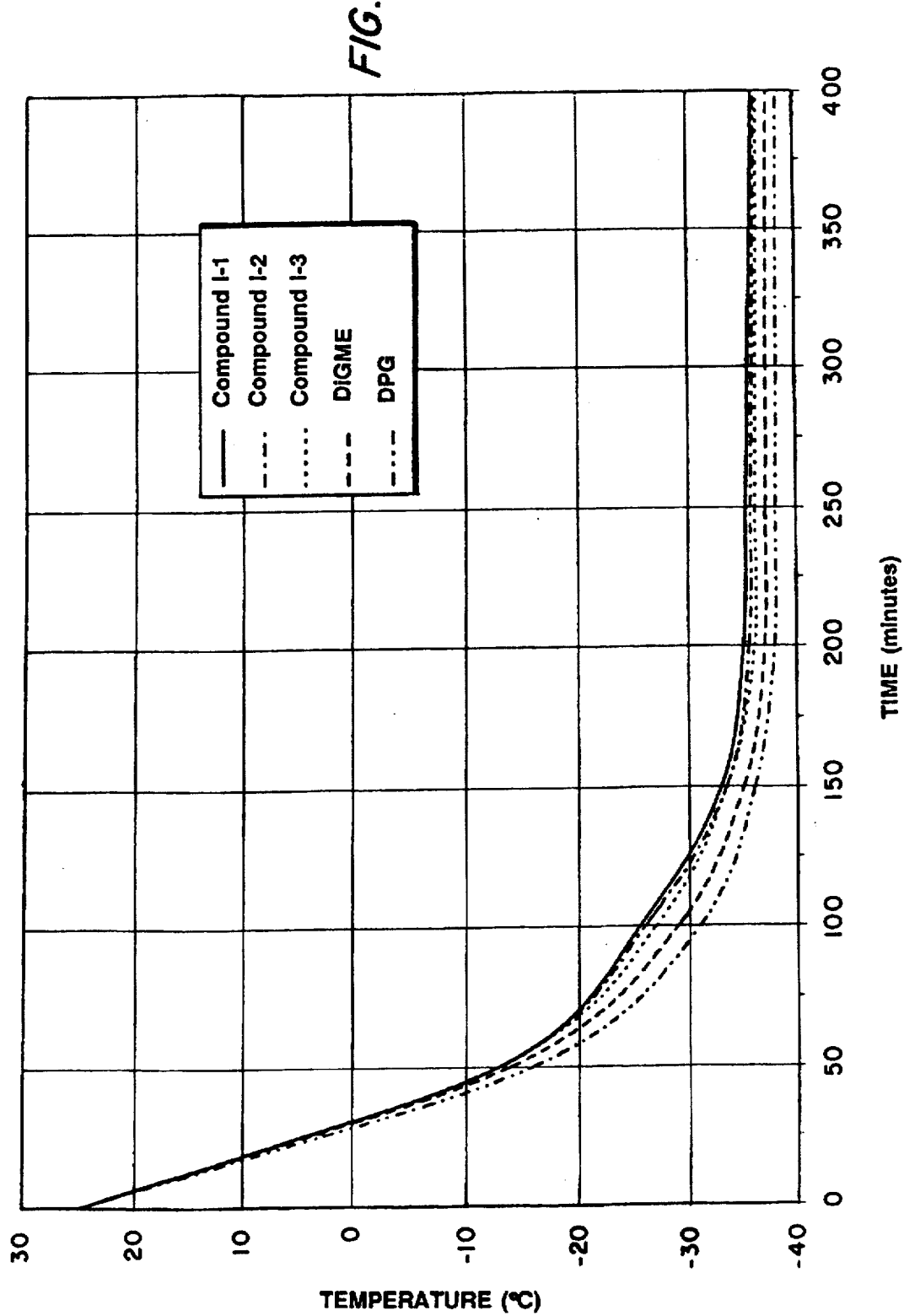
FIG. 1 is a graph showing that representative compounds I-1, I-2, and I-3 exhibit similar time vs. temperature dependence as compared with DiEGME and DPG.

This invention pertains to a fuel and to a deicing compositions which are prepared using a compound selected from acetals, ketals, esters, and mixtures thereof or derivatives of the acetals, ketals, esters and mixtures thereof. This invention also pertains to a process for deicing a substrate using the deicing composition of this invention.

Acetals, ketals and esters suitable herein can be prepared by reacting a dydroxy compound having 2 to 6 hydroxy (OH) groups with an aldehyde, or a ketone, or an acid. Suitable acetals and esters can be produced by reacting a hydroxy compound containing 2 to 6 hydroxy groups with an aldehyde or an acid each containing 1 to 7 carbon atoms. Suitable ketals can be prepared by reacting a hydroxy compound containing 2 to 6 hydroxy groups with a ketone containing at least 3 and up to 7 carbon atoms. Because of fuel and water solubility concerns, the final compound will typically contain 13 or less carbon atoms.

The acetals, ketals, and esters suitable herein contain 3 to 15, preferably 4 to 12 carbon atoms, and have weight average molecular weight of 50 to 350, preferably 104 to 260. Examples of suitable compounds include acetals and ketals of monosaccharides selected from the group consisting of hexoses ($C_6H_{12}O_6$), glucose, fructose, galatose, mannose, pentoses ($C_5H_{10}O_5$), arabinose, ribose, and xylose. These mono and di acetals can be synthesized from formaldehyde, acetaldehyde, propionaldehyde, acetone, butanone and others. Examples of esters, which include mono and multisubstituted esters, include esters which can be synthesized from the corresponding acids, i.e., formic acid, acetic acid, benzoic acid, butyric acid, and 2,2-dimethyl propionic acid, to make formates, acetates, benzoates, butyrates, and pivalates, respectively. The esters can also be produced from the reaction of a hydroxy compound capable of forming esters. Suitable acids include formic acid, acetic acid, propanoic acid, butyric acid, and pentanoic acid. Examples of suitable hydroxy compounds include glycerol, trimethylolpropane, and pentaerythritol.

Glucitol, arabitol, erythritol, or glycerin can also be employed to obtain the acetals, ketals and esters described above as well as oligosaccharides, sucrose, maltose, lactose, and raffinose. Also, the acetals, ketals, and esters described above can be derived from starch or cellulose.

Examples of specific compounds useful herein, include the following:

| | |
|---|---|
| 2,2-Dimethyl-1,3-dioxolane-4-methanol | (Cpd I-1) |
| 2-Methyl-1,3-dioxolane-4-methanol | (Cpd I-2) |
| 1,3-Dioxolane-4-methanol | (Cpd I-3) |
| Glyceryl tri-n-butyrate | (Cpd I-4) |
| 1,2:3,4-Di-o-isopropylidene-D-galactopyranose | (CpdIII-1) |
| 1,2:3,5-Di-o-isopropylidene-D-xylofuranose | (Cpd V) |
| (2,2,3-trimethyl-[1,3]dioxan-5-yl)-methanol | (Cpd VI-1) |
| (2,5-dimethyl-[1,3]dioxan-5-yl)-methanol | (Cpd VI-2) |
| (5,methyl-[1,3]dioxan-5-yl)-methanol | (Cpd VI-3) |
| 2,4,8,10-Tetraoxaspiro[5,5]-undecane | (Cpd VII-1) |

Compounds I-1, I-2, I-3, and I-4 are all based upon the structure of the glycerol starting material. Compound V-1 is based on the structure of the alpha-furanose starting material. Compounds VI-1, VI-2 and VI-3 are based on the trimethylolpropane starting material. Compound VII-1 is based on the pentaerythritol starting material.

Certain of the compounds identified above, can be prepared in a manner schematically illustrated below:

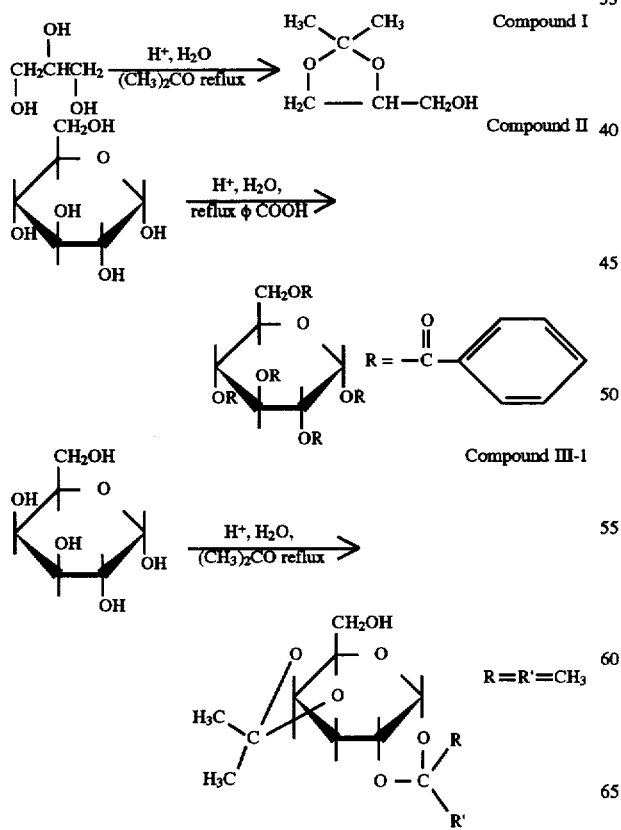

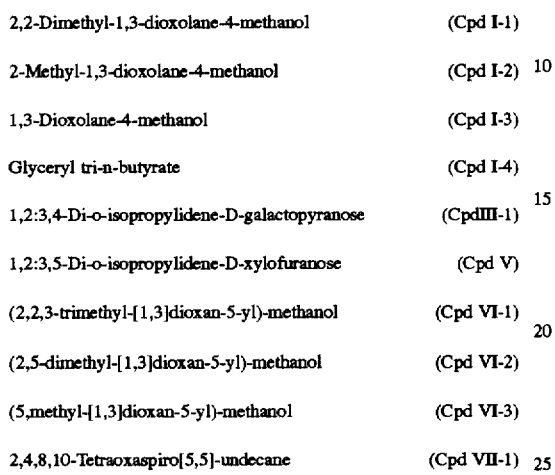

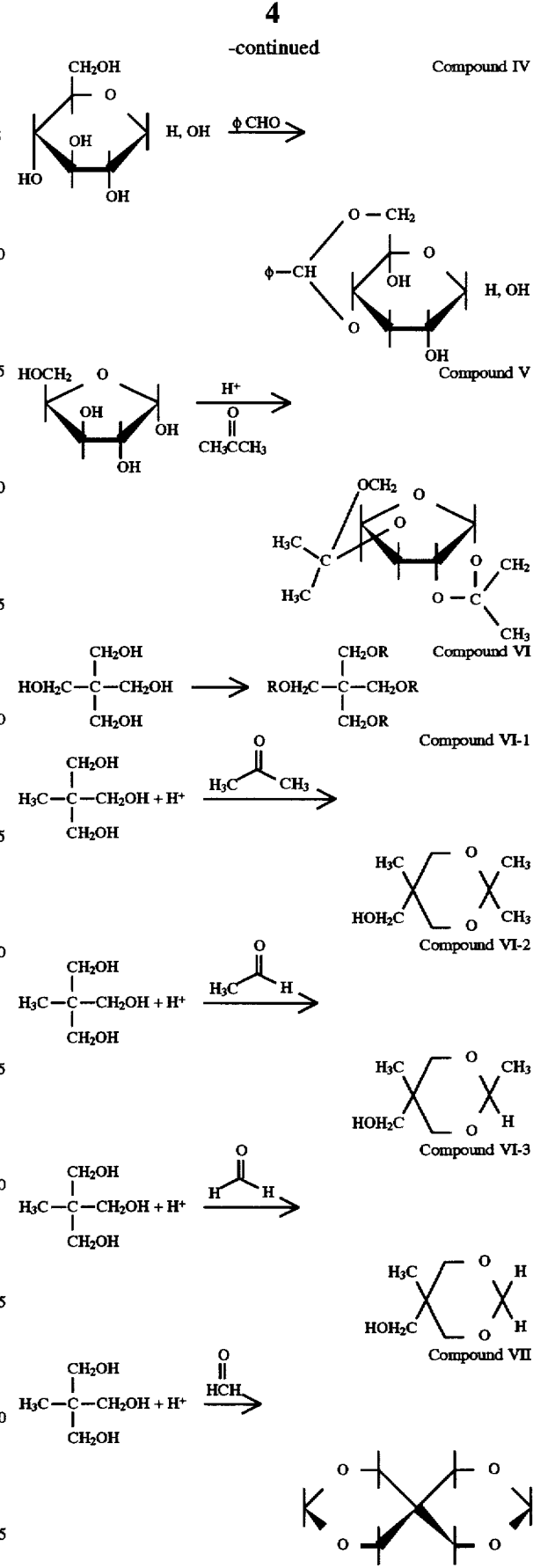

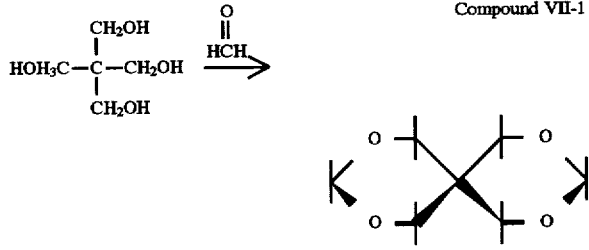

In a fuel composition, the compound has an effective solubility in jet fuel, typically at least 0.10 volume percent, preferably up to 0.30 volume percent, more preferably from 0.10 to 0.20 volume percent, and most preferably 0.15 volume percent. The fuel composition typically contains an effective concentration of the compound to maintain the composition above its freezing point in liquid state. The concentration used is soluble in jet fuel. The jet fuel can have, in addition to hydrocarbons, trace amounts of water, typically at a ppm level. Specifications for jet fuel are set forth in Table 1, below.

TABLE 1

SPECIFICATION LISTING
JET FUEL

COMMERCIAL SPECIFICATIONS

| | | |
|---|---|---|
| ASTM-D1655 | | GRADES JET A, JET A-1, JET |
| IATA GUIDANCE MATERIAL | | GRADES JET A-1, JET B |

MILITARY SPECIFICATIONS

| | | | |
|---|---|---|---|
| USA- | MIL-T-5624 | GRADE JP-4 | NATO F-40 |
| | MIL-T-5624 | GRADE JP-5 | NATO F-44 |
| | MIL-T-83133 | GRADE JP-8 | NATO F-34 |
| | MIL-P-87107 | GRADES JP-9 AND JP-10 | |
| UK- | DERD 2454 | GRADE AVTAG | NATO F-40 |
| | DERD 2453 | | NATO F-34 |
| | DERD 2452 | GRADE AVCAT | NATO F-44 |
| | DERD 2494 | GRADE AVTUR | NATO F-35 |

JET FUEL GRADES
DEFINED BY VOLATILITY AND FREEZING POINT
KEROSINE-TYPE FUELS

| GRADE | FLASH POINT | FREEZING POINT |
|---|---|---|
| COMMERCIAL | | |
| JET 1 | 38° C. (100° F.) MIN | −40° C. MAX |
| JET A-1/AVTUR | 38° C. (100° F.) MIN | −47° C. MAX |
| MILITARY | | |
| JP-5/AVCAT | 60° C. (140° F.) MIN | −46° C. MAX |
| JP-8 | 38° C. (100° F.) MIN | −47° C. MAX |

| GRADE | VAPOR PRESSURE | FREEZING POINT |
|---|---|---|
| COMMERCIAL | | |
| JET B | 14–21 KPA (2–3 PSI) | −50° C. |
| MILITARY | | |
| JP-4/AVTAG | 14–21 KPA (2–3 PSI) | −58° C. |

| GRADE | FLASH POINT | FREEZING POINT |
|---|---|---|
| JP-9 | 16° C. MIN TO 27° C. MAX (60° F. MIN–80° C. MAX) | −54° C. MAX |
| JP-10 | 55° C. MIN (131° C. MIN) | −79° C. MAX |

*ALSO LIMITED BY COMPOSITION

The compounds utilized in the fuel compositions of the present invention have been designed to achieve a desirable solubility in jet fuel so that by means of each compound's colligative properties with water, it effectively prevents the formation of ice at temperatures well below freezing temperature of the fuel compositions, typically down to −35° C. in fuel system applications.

In a deicing composition, for a plane wing or a runway deicing application, the compound should have adequate solubility in water to solubilize the added amount of the compound, typically at least 30 volume percent and no more than 60 volume percent, and preferably from 30 to 55 volume percent.

The compounds utilized in the deicing compositions of the present invention are benign or non-toxic, biodegradable compounds which have been designed to achieve a desirable solubility in water so that by means of the compound's colligative properties with water, it effectively prevents the formation of ice at temperatures of down to 18° C. temperature difference from ambient for wing/runway applications or other surfaces. These compositions can be used as solid or liquid concentrates for physical application to wings and runways or other surfaces.

A fuel composition can be prepared by mixing a hydrocarbon, such as a jet fuel, with an effective amount of a compound, as defined herein. A fuel composition can be prepared by injecting a compound at a refinery where the fuel is prepared. A deicing composition can be prepared by mixing a carrier, such as water, with an effective amount of a compound, as defined herein.

Any appropriate device may be employed to apply the deicing composition to a substrate. Also, additional ingredients may be added to the composition and the mixture may be blended to provide an aqueous suspension. Alternatively, a dry mixture of the deicing composition may be prepared by simply mixing dry solids. The dried mixture can be applied to the surface using an appropriate device. The ingredients can be applied in any desired combination of liquid or solid form.

The invention having been genarally described, the following example is given as a particular embodiment of the invention to demonstrate the practice and advantages thereof. It is understood that the example is given by way of illustration and is not intended to limit in any manner the specification or any claim that follow.

1. Example

This example demonstrates known preparation of the preferred known compounds useful in the herein-described and claimed fuel and deicing compositions and in the herein-described and claimed deicing process.

The general synthesis procedure begins with the monosaccharide, mannose, to obtain glycerol. Glycerol is the only compound formed from the reduction of mannose. Other sugars can be used that give similar types of reactions and compounds.

Acetone (232 g., 4.5 moles), or acetaldehyde (197 g., 4.5 moles), or formaldehyde (135 g., 4.5 moles), is then added to the glycerol (100 g., 1.1 moles) in a toluene solvent (300 ml), containing 3.0 g p-toluene sulfonic acid and 255 g. of 5Å molecular sieves all in a 2,000 ml two-necked, round-bottomed flask, fitted with a mechanical stirrer and a condenser. A freezing mixture of ethylene glycol-water at −25.0° C. is circulated through the condenser. The stirred reaction mixture is heated under gentle reflux for 33 hours using a heating mantle. After reflux, the condenser is disconnected and excess acetaldehyde is allowed to evaporate. The acidic reaction mixture is then neutralized with 3.0 g. of sodium acetate. The molecular sieves are separated by vacuum filtration using a Büchner funnel. The resulting liquid is distilled under vacuum. The colorless organic product which distilled at 80°–82° C./10mm is collected for the acetone derivative to give a yield of 88%; for the acetaldehyde derivative, the product distilling at 85°–90° C./1 mm is collected to give a yield of and for the formaldehyde derivative, the product distilling at 95°–96° C./10 mm is collected.

The acetone derivative is Compound I-1, the acetaldehyde derivative is Compound I-2, and the formaldehyde derivative is Compound I-3. Compounds I-1, I-2, and I-3, as well as schematic preparation thereof, are illustrated in Table 2, below.

TABLE 2

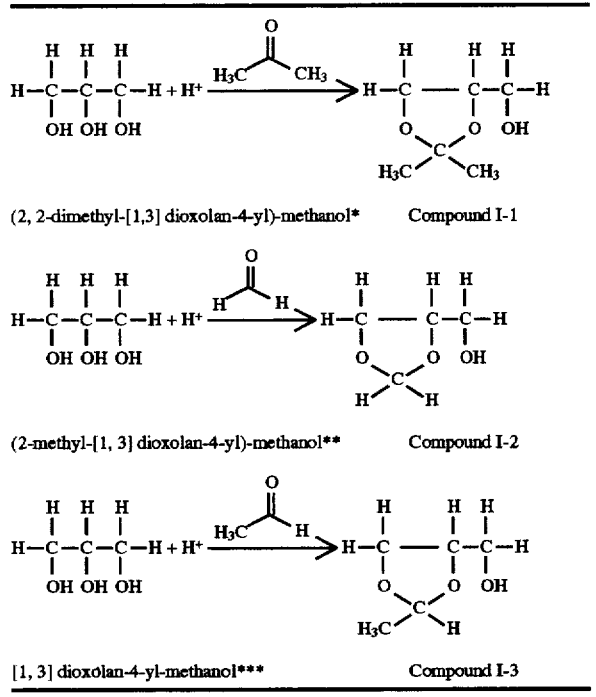

* Also named 2,2-dimethyl-1,3-dioxolane-4-methanol
** Also named 2-methyl-1,3-dioxolane-4-methane
*** Also named 1,3-dioxolane-4-methanol Compounds I-1, I-2, and I-3 in Table 2 were subjected to testing for deicing characteristics. Compounds I-1, I-2, and I-3 were compared to EGME, DiEGME, and dipropylene glycol, DPG. The tests were conducted in a 4.55 liter simulator rig. The results are shown in FIGS. 1 and 2.

Figure 2:
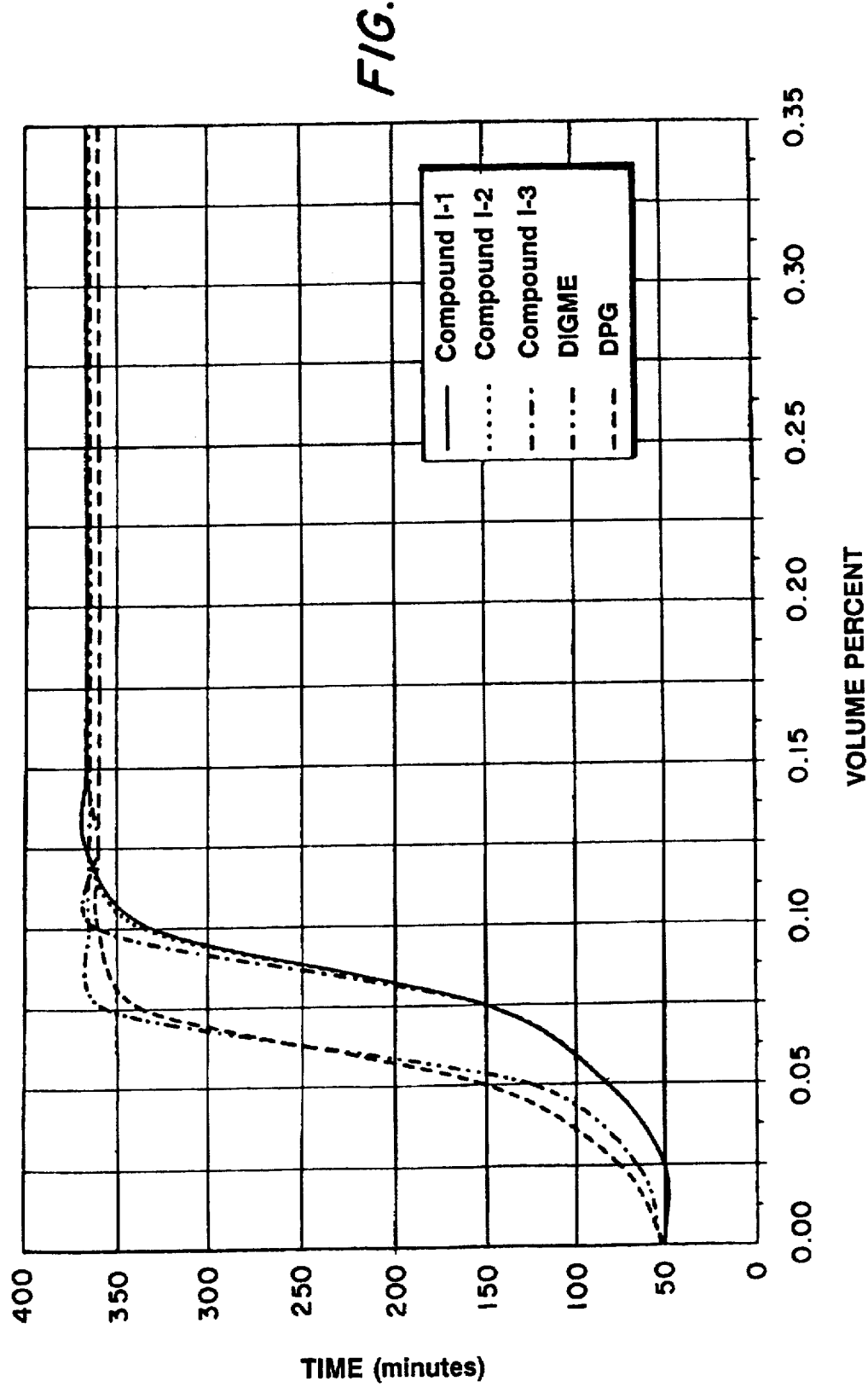
FIG. 2 is a graph showing that representative compounds I-1, I-2, and I-3 of the present invention exhibit a similar volume percent vs. time relationship as compared with DiEGME and DPG.

The data illustrated in FIGS. 1 and 2 show that compounds I-1, I-2, and I-3 are effective deicers and closely parallel the behavior of EGME and DiEGME. More specifically, FIG. 1 shows that compounds I-1, I-2, and I-3 exhibit similar time vs. temperature dependence as exhibited by DiEGME and DPG. The data for FIG. 1 was based on 3500 ml of solution containing fuel and 0.10 % by volume of one of the compounds. Temperature of the solution was monitored as it was lowered progressively to −39° C. Based on the graph of FIG. 1, at 200 minutes, temperature of the solution containing 0.10% by volume of any one of the compounds was below −35° C.

FIG. 2 shows that compounds I-1, I-2, and I-3 of the present invention exhibit a similar volume percent vs. time relationship as compared with DiEGME and DPG. The data for FIG. 2 was based on 3500 ml of solution containing fuel and one of the compounds in a varying amount. The solution was doped fuel that was circulated in a continuous closed loop containing an inline filter while temperature of the solution was lowered to −39° C. in a programmed fashion. The time it took to plug up the filter was then measured and recorded. Based on the graph of FIG. 2, at a concentration of 0.10% by volume of any one of the compounds, it took about 360 minutes to plug up the filter, i.e., an indication that the solution started to freeze.

Figure 3:
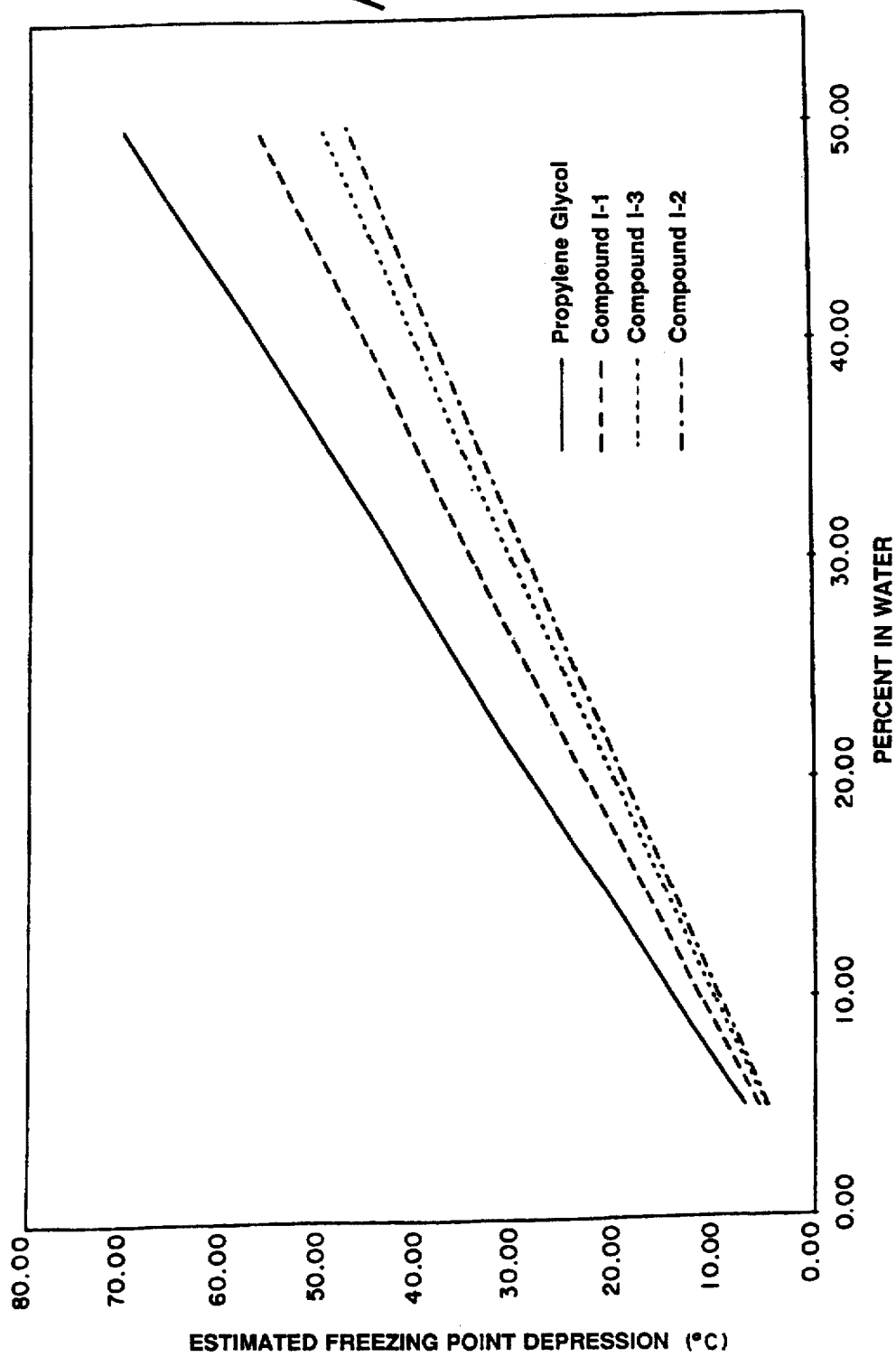
FIG. 3 is a graph showing that representative compounds i-1, I-2, and I-3 of the present invention for deicing applications exhibit similar freezing point depression as compared with propylene glycol.

For the deicing composition of the present invention, FIG. 3 shows that in deicing composition applications, compounds I-1, I-2, and I-3 exhibit similar freezing point depression as compared with propylene glycol.

The compounds were also tested for fuel instability and incompatibility reactions. They were tested for storage stability by ASTM method D5304-92 in JP-8 (ASTM, 1992). The JP-8 fuel containing the sugar derived compounds was subjected to a 16 hour, 90° C. time temperature regimen at 90 psig over-pressure of oxygen (Hardy, et al., 1989).

All of the compounds were tested for fuel sediment formation and for peroxidation. None of the added acetal or ketals compounds formed any measurable solids (<0.01 mg) or showed any increased peroxidation. Successfully passing this accelerated testing regiment shows that these compounds do not induce instability in an otherwise stable fuel. In fact, based on the accelerated storage tests, the compounds are stable in Jet A or JP-8 for at least two years. They do not cause peroxidation and they mimic the behavior of EGME and DiEGME in JP-8 rig simulator tests.

The compounds utilized in the fuel compositions of the present invention have been designed to achieve a desirable solubility in jet fuel so that by means of each compound's colligative properties with water, it effectively prevents the formation of ice at temperatures well below freezing temperature of the fuel compositions, typically down to −35° C. in the fuel system applications.

Various modes of carrying out the invention will be evident to those skilled in the art without departing from the spirit and scope of the present invention as defined in the claims that follow.

In the claims:

1. A deicing composition comprising an effective amount of a compound to depress freezing point of a mixture of said deicing composition and any ice, said compound is selected from the group consisting of acetals, ketals, esters, derivatives of the acetals, derivatives of the ketals, derivatives of the esters and mixtures thereof, said compound has weight average molecular weight of from 50 to 350 and is a reaction product of a hydroxy compound of 2 to 6 hydroxy groups with an aldehyde of 1 to 7 carbon atoms, or a ketone of 3 to 7 carbon atoms, or an acid of 1 to 7 carbon atoms.

2. The deicing composition according to claim 1, wherein said compound contains from 4 to 12 carbon atoms.

3. The deicing composition of claim 1, wherein said compound has solubility in water of at least 30 volume percent.

4. The deicing composition of claim 1, wherein said compound has solubility in water of from 30 to 55 volume percent.

5. The deicing composition of claim 1, wherein said compound has weight average molecular weight of from 104 to 260.

6. The deicing composition according to claim 1, wherein said compound is a reaction product of glycerol with acetone, or glycerol with acetaldehyde, or glycerol with formaldehyde.

7. The deicing composition according to claim 1, wherein said compound is a reaction product of trimethylolpropane with acetone, or trimethylolpropane with acetaldehyde, or trimethylolpropane with formaldehyde.

8. The deicing composition according to claim 1, wherein said compound is a reaction product of a first reactant selected from the group consisting of glycerol, trimethylolpropane, pentaerythritol, and mixtures thereof, and a second reactant selected from the group consisting of formic acid, acetic acid, propanoic acid, butyric acid and pentanoic acid.

9. The deicing composition of claim 1, wherein said compound is selected from the group consisting of 2,2-Dimethyl-1,3-dioxolane-4-methanol; 2-Methyl-1,3-dioxolane-4-methanol; 1,3-Dioxolane-4-methanol; Glyceryl tri-n-butyrate; 1,2:3,4-Di-o-isopropylidene-D-galactopyranose; 1,2:3,5-Di-o-isopropylidene-D-xylofuranose; (2,2,3-trimethyl-[1,3]dioxan-5-yl)-methanol; (2,5-dimethyl-[1,3]dioxan-5-yl)-methanol;(5,methyl-[1,3]dioxan-5-yl)-methanol; 2,4,8,10-Tetraoxaspiro[5,5]-undecane; and mixtures thereof.

10. A process for deicing a substrate comprising applying to said substrate a composition comprising a compound selected from the group consisting of acetals, ketals, esters, derivatives of the acetals, derivatives of the ketals, derivatives of the esters and mixtures thereof, the compound has weight average molecular weight of from 50 to 350 and is a reaction product of a hydroxy compound of 2 to 6 hydroxy groups with an aldehyde of 1 to 7 carbon atoms, or a ketone of 3 to 7 carbon atoms, or an acid of 1 to 7 carbon atoms.

11. The process according to claim 10, wherein said compound contains 4 to 12 carbon atoms.

12. The process according to claim 10, wherein said compound is selected from the group consisting of acetals, ketals, esters, which have solubility in water of at least 30 volume percent.

13. The process according to claim 10, wherein the compound has solubility in water of from 30 to 55 volume percent.

14. The process according to claim 10, wherein the compound has weight average molecular weight of from 104 to 260.

15. The process according to claim 10, wherein the compound is a reaction product of glycerol with acetone, or glycerol with acetaldehyde, or glycerol with formaldehyde.

16. The process according to claim 10, wherein the compound is a reaction product of trimethylolpropane with acetone, or trimethylolpropane with acetaldehyde, or trimethylolpropane with formaldehyde.

17. The process according to claim 10, wherein the compound is a reaction product of a first reactant selected from the group consisting of glycerol, trimethylolpropane, pentaerythritol, and mixtures thereof, and a second reactant selected from the group consisting of formic acid, acetic acid, propanoic acid, butyric acid and pentanoic acid.

18. The process of claim 10, wherein the compound is selected from the group consisting of 2,2-Dimethyl-1,3-dioxolane-4-methanol; 2-Methyl-1,3-dioxolane-4-methanol; 1,3 -Dioxolane-4-methanol; Glyceryl tri-n-butyrate; 1,2:3,4-Di-o-isopropylidene-D-galactopyranose; 1,2:3,5-Di-o-isopropylidene-D-xylofuranose; (2,2,3-trimethyl-[1,3]dioxan-5-yl)-methanol; (2,5-dimethyl-[1,3]dioxan-5-yl)-methanol; (5,methyl-[1,3]dioxan-5-yl)-methanol; 2,4,8,10-Tetraoxaspiro[5,5]-undecane; and mixtures thereof.

* * * * *